(12) United States Patent
Broch et al.

(10) Patent No.: US 9,992,068 B2
(45) Date of Patent: *Jun. 5, 2018

(54) RULE BASED MOBILE DEVICE MANAGEMENT DELEGATION

(71) Applicant: MOBILE IRON, INC., Mountain View, CA (US)

(72) Inventors: Joshua Glenn Broch, Cupertino, CA (US); Thomas Edward Wagner, San Jose, CA (US); Phillip Charles Krasko, Redwood City, CA (US); Jesse Wagner Lindeman, San Jose, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/495,343

(22) Filed: Apr. 24, 2017

(65) Prior Publication Data

US 2017/0230248 A1  Aug. 10, 2017

Related U.S. Application Data

(63) Continuation of application No. 14/994,782, filed on Jan. 13, 2016, now Pat. No. 9,668,124, which is a continuation of application No. 14/446,229, filed on Jul. 29, 2014, now Pat. No. 9,271,142.

(60) Provisional application No. 61/859,427, filed on Jul. 29, 2013.

(51) Int. Cl.
*H04W 24/02* (2009.01)
*H04L 12/24* (2006.01)
*H04W 8/18* (2009.01)
*H04W 12/08* (2009.01)
*H04W 4/00* (2018.01)

(52) U.S. Cl.
CPC ......... *H04L 41/0893* (2013.01); *H04W 4/001* (2013.01); *H04W 4/50* (2018.02); *H04W 8/186* (2013.01); *H04W 12/08* (2013.01)

(58) Field of Classification Search
CPC ........... H04W 8/22; H04W 4/22; H04W 4/02; H04W 4/16; H04W 88/06; H04W 12/08; H04W 12/06; H04B 3/38; H04M 1/72577; H04L 9/3242
USPC ................ 707/822, 718; 455/406, 418, 419; 713/340
See application file for complete search history.

(56) References Cited

U.S. PATENT DOCUMENTS

| | | | |
|---|---|---|---|
| 2006/0161646 A1* | 7/2006 | Chene | G06F 17/243 709/223 |
| 2008/0014904 A1 | 1/2008 | Crimi | |
| 2009/0088142 A1 | 4/2009 | Baribault | |
| 2014/0298320 A1* | 10/2014 | Xu | G06F 8/62 717/174 |

* cited by examiner

*Primary Examiner* — Phuoc H Doan
(74) *Attorney, Agent, or Firm* — Van Pelt, Yi & James LLP

(57) ABSTRACT

Rule-based mobile device management delegation is disclosed. A set of rules are applied to attributes associated with a mobile device to assign the mobile device to one of a plurality of management partitions. The mobile device is managed according to a policy associated with the assigned management partition.

20 Claims, 9 Drawing Sheets

RULE BASED MOBILE DEVICE MANAGEMENT DELEGATION

CROSS REFERENCE TO OTHER APPLICATIONS

This application is a continuation of co-pending U.S. patent application Ser. No. 14/994,782, entitled RULE BASED MOBILE DEVICE MANAGEMENT DELEGATION, filed Jan. 13, 2016, which claims priority to U.S. patent application Ser. No. 14/446,229, now U.S. Pat. No. 9,271,142, entitled RULE BASED MOBILE DEVICE MANAGEMENT DELEGATION, filed Jul. 29, 2014, which claims priority to U.S. Provisional Patent Application No. 61/859,427, entitled RULE BASED MOBILE DEVICE MANAGEMENT DELEGATION, filed Jul. 29, 2013, all of which are incorporated herein by reference for all purposes.

BACKGROUND OF THE INVENTION

Mobile device management is becoming more and more commonplace in the enterprise environment. In enterprise(s), mobile devices may be managed across a variety of locations, divisions, subsidiaries, groups, etc. In some cases, mobile devices may be managed in an enterprise by organizing the devices into groups (e.g., partitions) of devices managed, for example, by different administrators. Typically, mobile devices are manually assigned (e.g., by an administrator) to partitions. Many enterprises may manage a large number of mobile devices, and manual assignment of mobile devices to partitions may be cumbersome. For example, new mobile devices may be frequently added to an enterprise management domain when new employees are hired, when existing employees purchase new phones, and/or when other events occur. In another example, it may be necessary to move a mobile device from partition to partition when certain events occur (e.g., when an employee moves to a different department, is promoted, moves to a new location, etc.). Typically, when a mobile device is reassigned to a new partition, an administrator may manually update policies, configurations, and/or perform other actions applicable to the mobile device.

BRIEF DESCRIPTION OF THE DRAWINGS

Various embodiments of the invention are disclosed in the following detailed description and the accompanying drawings.

DETAILED DESCRIPTION

Figure 1:
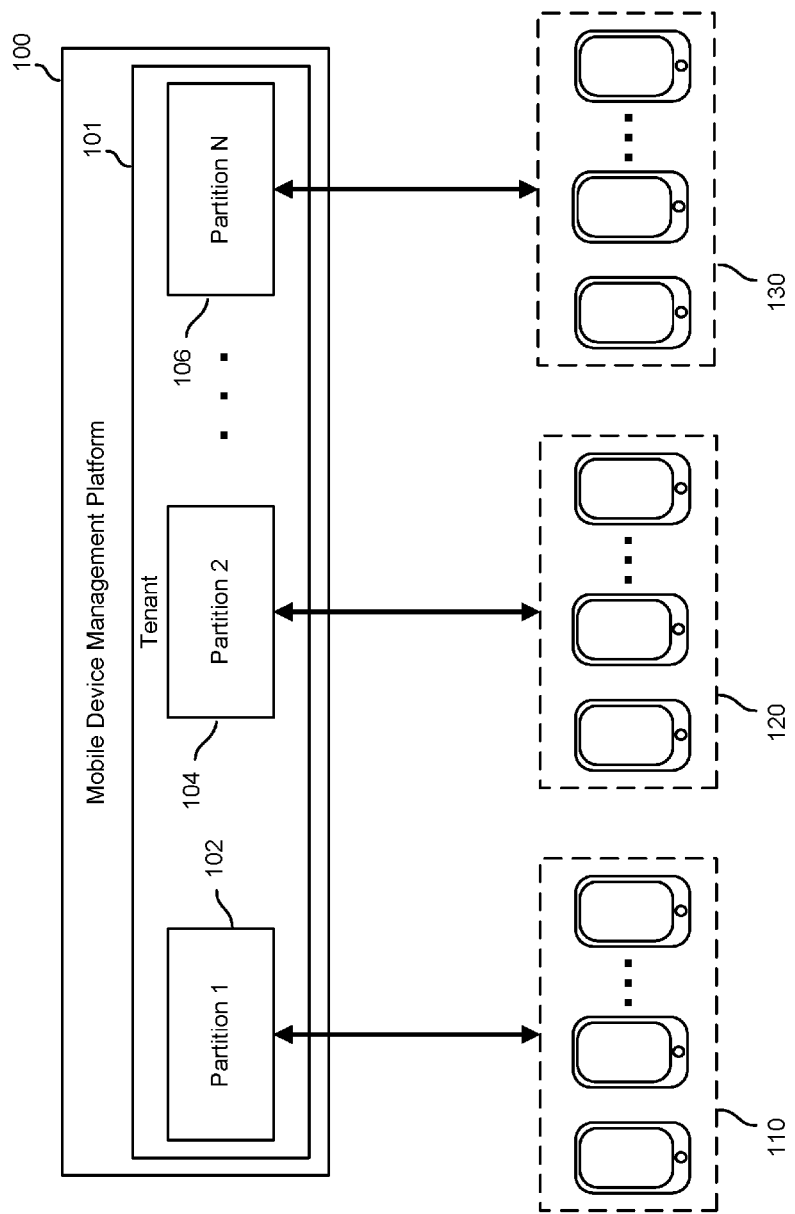
FIG. 1 is a block diagram illustrating embodiments of rule-based mobile device management delegation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rule-based mobile device management delegation is disclosed. A set of rules may be applied to attributes associated with a mobile device to assign the mobile device to one of a plurality of management partitions. The mobile device may be managed according to a policy associated with the assigned management partition.

In various embodiments, rule-based automatic association of a mobile device and/or user with a particular partition (e.g., delegated and/or potentially-delegated domain) is provided, for example, based on attributes associated with a mobile device (e.g., user and/or mobile device attributes). In some embodiments, mobile devices managed by an enterprise (e.g., company, organization, government entity, etc.) may be assigned to partitions based on, for example, the application of rules. In certain cases, rules may correspond to partitions and/or domains within a mobile device management architecture. In the event attributes associated with a mobile device and/or user satisfy a rule, the mobile device may be assigned to a partition associated with the rule. Once assigned to a partition, a mobile device may be managed within the context of the partition. For example, the posture of a device may be changed (e.g., automatically changed, updated, etc.) upon assignment to a partition. In one example, a mobile device configuration associated with a partition may be applied to a device upon assignment of the device to the partition. In certain cases, other configurations not associated with the assigned partition may be removed. In another example, policies associated with a partition may be applied (e.g., automatically applied) to the device upon assignment of the device to the partition.

FIG. 1 is a block diagram illustrating embodiments of rule-based mobile device management delegation. According to some embodiments, a delegation functionality and/or interface are provided with a mobile device management platform 100 to enable mobile device management, mobile app and/or content management, and/or mobile support services to be controlled and/or provided separately with respect to respective one or more tenants in a site (e.g., a multi-tenant site, single tenant site, etc.), such as regions, business units, and/or other subdivisions within an enterprise, and/or with respect to separate enterprises managed and/or supported by a third party (such as a third party helpdesk or other support service provided by the third party to multiple enterprises and/or portions thereof). The example illustrated in FIG. 1 may depict a mobile device management platform 100 (e.g., a site) including a single tenant 101. In various embodiments, a site may be associated with multiple tenants (e.g., multiple separate tenants). For example, a multi-tenant site may include one or more tenants, and each of the tenants may include one or more partitions (e.g., first partition 102, second partition 104, and so on up to an Nth partition 106).

In some embodiments, within an enterprise and/or other higher level group of mobile devices and/or users, one or more partitions (e.g., first partition 102, second partition 104, and so on up to an Nth partition 106) and/or domains the management of which is capable of being delegated in whole or in part may be defined. For example, an enterprise may define separate domains for North America, Asia/Pacific, Europe, and/or other geographic regions. Within a single enterprise and/or other multi-tenant site, one or more of mobile device management (e.g., which devices are allowed and/or supported, how they are configured, etc.); content (e.g., applications, app content, files, documents, etc.), management (e.g., which apps may be installed, which apps are required, which apps may access enterprise data, conditions under which apps and/or data may be deleted or "wiped", etc.); and support (e.g., helpdesk) may be separately delegated to, e.g., brought under the administrative control and/or responsibility of, a potentially different authority and/or provider.

In various embodiments, a mobile device management platform 100 may govern the policies, configurations, settings, content access permissions, support, and/or other aspects associated with sets and/or groups of mobile devices 110, 120, 130. In some embodiments, the mobile device management platform 100 may provide mobile device and/or content-related management and/or support functionality to at least three potentially different sets of users. For example, mobile device management functionality may be provided to an enterprise IT organization, third party IT organization, and/or other entity. Helpdesk functionality may be provided to an enterprise support department, a third-party support organization (e.g., third party contractor, who may support users in multiple enterprises and/or portions thereof), and/or other entity. Content management functionality may be provided to business units comprising an enterprise, each potentially having its own content types and/or requirements.

In some embodiments, the mobile device management platform 100 may provide syntax, functionality, and/or other features allowing administrators to define and support multiple tenants, each of which may be a separate enterprise and/or a portion thereof. The mobile device management platform 100 may provide syntax, functionality, and/or other features allowing administrators to define logical partitions, such as device management partitions, content management partitions, helpdesk partitions, support partitions, and/or other types of partitions. The responsibility and control over each of the partitions may be delegated separately. For example, each of multiple partitions may be associated with (e.g., assigned to, delegated to) administrator(s), support organization(s) (e.g., helpdesk group, third party contractor, who may support users in multiple enterprises), IT organization(s), user group(s) (e.g., users in a business group in an enterprise). In the example shown, a first set of mobile devices 110 may be assigned to a first partition 102 (e.g., Partition 1), a second set of mobile devices 120 may be assigned to a second partition 104 (e.g., Partition 2), and so on up to an Nth set of mobile devices 130 assigned to an Nth partition 106 (e.g., Partition N). The partitions shown (e.g., first partition 102, second partition 104, Nth partition 106, etc.) may include, for example, one or more of device management partitions, content management partitions, support partitions, and/or other partitions.

Figure 2:
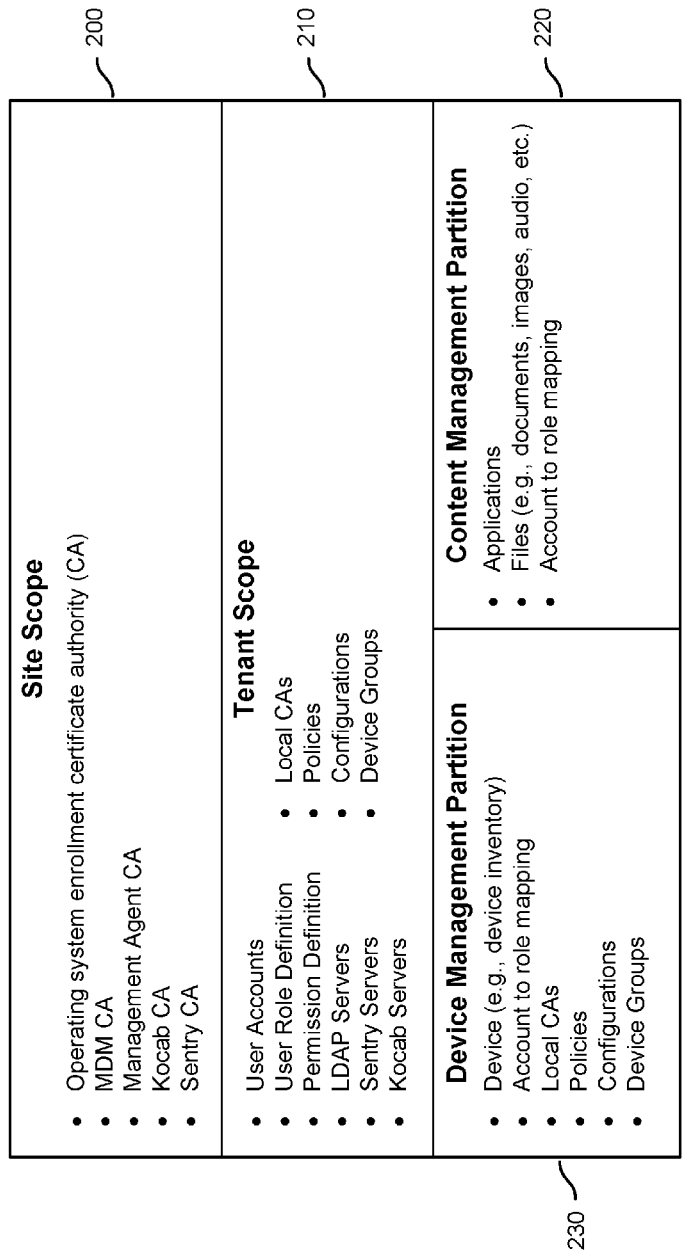
FIG. 2 is a table illustrating embodiments of domain object scope in a partitioned mobile device management platform.

FIG. 2 is a table illustrating embodiments of domain object scope in a partitioned mobile device management platform. The techniques disclosed herein may provide mobile device and/or user management across a site including one or more tenants. In various embodiments, a site may include a (possibly) multi-tenant cluster of systems configured to provide rule-based delegation of mobile device management, content management, and/or support (e.g., helpdesk services). For example, a site may be associated with a mobile device management platform provider (e.g., MobileIron). In some embodiments, a tenant may include a customer (e.g., enterprise, company, organization, etc.) within a site. In various embodiments, a tenant may include one or more device management partitions, content management partitions, support partitions (e.g., helpdesk partitions), and/or other partitions.

In various embodiments, objects (e.g., domain objects) associated with the management of mobile devices across one or more tenants may be associated with and/or assigned a scope. In various embodiments, the scope of domain objects may be defined with respect to a site, tenant, device management partition, content management partition, support partition, and/or other partition. A scope associated with an object may, for example, define a layer in which an object resides. A scope associated with an object may, for example, define which administrators have access to and/or authority to act upon an object. For example, objects including a site scope may be accessible, editable, and/or configurable at the site-level (e.g., by administrators associated with a site). In another example, objects including a device management partition scope may be accessible, editable, and/or configurable by an administrator within a tenant associated with that device management partition (e.g., by an administrator assigned the management partition within the tenant).

In various embodiments, actions taken on objects included in a scope may be automatically applied to devices and/or users associated with that scope. For example, actions taken with respect to objects at the tenant level may be applied to devices and/or users associated with that tenant. In another example, actions taken (e.g., by administrators) with respect to objects in a device management partition (e.g., having device management partition scope) may be applied to devices and/or users assigned to that device management partition.

In the example shown in FIG. 2, certificate authority (CA) objects for mobile devices managed across multiple tenants may include site scope 200. For example, operating system (OS) enrollment CAs, mobile device management (MDM) CAs, management agent CAs, server CAs (e.g., Sentry server CAs, proxy server CAs, etc.), and/or other CA-related objects may have site scope 200. In various embodiments, certificate authorities (CAs) issue client certificates to the relevant entities (e.g., tenants, device management partitions) for the purpose of mutual authentication. In various embodiments, a root CA may be included at the site level (e.g., within site scope 200), and one or more tenants within the site (e.g., as discussed below) may each include sub CAs (e.g., associated with the root CA) that may issue certificates for mutual authentication. In various embodiments, CA objects (e.g., root CA objects) scoped at the site level may be accessible to, editable by, and/or configurable by administrators associated with a site 200.

In various embodiments, configuration objects (e.g., site-level configuration objects) and/or various other objects may include site scope 200 (e.g., may be scoped at the site level). In one example, configuration objects including site scope 200 may be used and/or accessed by administrators associated with a site-level operations team. The operations team may, for example, configure a cluster of servers, change logging levels, monitor health, and/or perform other configuration operations. In some embodiments, any object associated with a site may include site scope 200.

In some embodiments, various objects including, for example, user account objects, user role definition objects, permission definition objects, server objects (e.g., Lightweight Directory Access Protocol (LDAP) server, Sentry/proxy server (e.g., integrated and/or standalone), and/or other server objects), and/or other objects may include tenant scope 210. In various embodiments, local CAs, policies, configurations (e.g., WiFi access configuration, passcode restrictions, etc.), device groups, and/or other objects may be associated with tenant scope 210 and/or partition scope (e.g., device management partition scope 230, as discussed below). Objects including tenant scope 210 may be managed within the context of, for example, a tenant (e.g., an enterprise, portion of enterprise, etc.). For example, objects including tenant scope may be accessible to, editable by, and/or configurable by administrators associated with a tenant (e.g., an enterprise, a portion of an enterprise, etc.). An administrator associated with a tenant may include an administrator that manages an entire enterprise and/or portion thereof. In some embodiments, objects with tenant scope 210 may include objects for each mobile device associated with a tenant (e.g., each device associated with an enterprise and/or portion of an enterprise).

In various embodiments, within a tenant objects associated with a device and/or user may be included in a content management partition 220, device management partition 230, support partition, and/or other partition (not shown). For example, device management partition scope 230, content management partition scope 220, support partition scope, and/or other partition scopes may include child scopes within a tenant scope 210 (e.g., may be dependent on a tenant scope 210). In some embodiments, when a tenant is generated (e.g., created, initially configured, etc.), it may be created with a default content management partition, default device management partition, and/or other default partitions. In some cases, objects that may have partition scope (e.g., content management partition scope 220, device management partition scope 230, etc.) are bound to a partition (e.g., the partition ID column in a database may not be nullable).

In the absence of being bound to a specific partition (e.g., using rule-based partition assignment), these objects may be bound to the appropriate default partition (e.g., a default partition associated with the tenant). For example, a mobile device and/or user may be assigned to a partition (e.g., a partition associated with a rule, a default partition, etc.) using the rule-based techniques discussed herein. Once assigned to a partition, objects associated with the mobile device and/or user may be accessible to, editable by, and/or configurable by administrators associated with that partition. For example, a device may be assigned to a device management partition associated with a sales department in an enterprise, and upon assignment, objects including device management partition scope (e.g., device objects, account to role mappings, local CAs, policies, configurations, device groups, etc.) that are associated with that mobile device may be accessible to, editable by, and/or configurable by an administrator associated with the sales device management partition.

In various embodiments, domain objects including, for example, applications, files (e.g., pdfs, documents, images, executables, etc.), account to role mapping objects, and/or other objects may be associated with a content management partition scope 220. A tenant (e.g., enterprise) may generate content partitions across various departments (e.g., sales, engineering, finance, etc.). Administration of these partitions may be delegated to a related line of business. In certain cases, access, permissions (e.g., read only, write, edit, etc.), and/or other rights associated with content in a partition may be determined based on role and/or other attributes. In one example, within a content management partition administrative users may change any configuration on the partition, content managers may add (e.g., only add) content to the partition, and/or a user may (e.g., only) view content in the partition.

In some embodiments, a content management partition 220 may include a set of user to role mappings that indicate who can publish content, a set of user to role mappings (e.g., permissions) that indicate who can view content, a set of device filters that may limit which devices can receive content (e.g., only company-owned devices), flags which indicate whether or not the content can be accessed by a user from an unregistered device, content (e.g., actual content, applications, files, etc.), and/or other objects.

According to various embodiments, various objects including, for example, device objects (e.g., including associated device inventory), account to role mapping objects, local CA objects, policies, configurations, device groups, and/or other objects may include device management partition scope 230. Similar to the content management partition approaches disclosed above, a device and/or user may be assigned to a device management partition, and upon assignment, objects associated with the mobile device and/or user may be accessible to, editable by, and/or configurable by administrators associated with that partition.

In various embodiments, local CAs, policies, configurations, device groups, and/or other objects may be created in a default partition and/or within a specific device management partition (e.g., as assigned using the rule-based techniques disclosed herein). In the event a local CA, policy, configuration, device group, and/or other object is created in the default partition, it may visible (e.g., accessible) in other partitions (e.g., all other partitions associated with that tenant). In some embodiments, however, a local CA, policy, configuration, device group, and/or other object created in the default partition may only be modified by a user (e.g., administrator) that has appropriate permissions in the default partition.

In one example, an enterprise may choose to partition device management based on region (e.g., Europe, Asia, North America). Management of each region may be delegated to specific users (e.g., specific enterprise administrators). For example, each of the multiple regions may include a set of devices managed by a separate administrator group. In various embodiments, mobile devices may not be assigned to (e.g., exist in) more than one device management partition. Each of multiple device management partitions may also have its own set of local CAs, policies, configurations, device groups, and/or any other domain object that may be scoped at the partition level.

In various embodiments, when no other device management partitions (e.g., partitions associated with rules) are created, all devices, configurations, policies, local CAs, and/or other device management objects may be included in a default device management partition.

In some embodiments, rule-based device management partitions and/or default management partitions may be defined. In certain cases, domain objects that should be visible across multiple partitions (e.g., regions) may be generated in a default device management partition. When objects are selected from the database, objects may be selected from a default device management partition as well as from device management partitions to which the user has been explicitly granted access. For modify operations (e.g., create a policy, wipe a device, etc.), actions may be allowed in the device management partitions to which the user (e.g., administrator) has been granted access. According to some embodiments, domain objects in a default device management partition can only be modified if a user has been granted explicit modification permissions within the default partition. For example, policies (e.g., all policies) created in the default partition may be visible in other partitions (e.g., all other partitions) and may be applied to device groups by administrators of those other partitions. In certain cases, however, administrators of the other partitions may not be provided rights to modify policies that are included in the default device management partition.

In some embodiments, by default content may be placed in a default content management partition. However, additional partitions may be created to limit who has access to the content. Additional partitions may be generated to define which groups of devices have access to certain content, as discussed in detail below. In some embodiments, content may not be available in more than one partition.

In various embodiments, partitions may be split (e.g., divided). In some cases, domain objects in a default device management partition may be visible in other device management partitions (e.g., associated with the same tenant). A tenant may, therefore, construct its partitions taking this into account. For example, certain tenants may choose to include all devices, policies, configurations, and/or other objects in a default device management partition. This configuration may, for example, be beneficial for smaller organizations and/or other entities where delegation may not be required.

In another case, device management partitions may be generated such that no devices are associated with the default device management partition. That way, only the policies and/or configurations that should be global are visible in all partitions. In certain cases, devices may only be visible in a non-default partition where they can be acted upon by the appropriate administrator. This configuration may, for example, be beneficial for larger organizations and/or other entities where delegation may be beneficial.

In a further use case, some devices (e.g., one or more devices) may be associated with a default management partition (e.g., default device management partition, default content management partitions, etc.) and other devices may be associated with non-default partitions (e.g., rule-based partitions).

By way of an example use case, the techniques disclosed herein may be used by an automobile company with numerous dealerships. For example, the automobile company may include 357 dealerships and each dealership may manage policies, configurations, helpdesk, and/or other aspects of the mobile devices associated with that dealership. In this case, 357 device management partitions may be created. Administrative roles within each device management partition may be assigned to at least one user (e.g., an administrator) at each dealership. The automobile company may obtain an MDM identity and upload it into a default device management partition, thereby initializing the MDM policy. The MDM policy in the default device management partition may then be visible and/or used in each of the 357 device management partitions. Policies, configurations, device groups, local certificates, and/or other objects may be created at the dealership level (e.g., device management partition) if required.

In another example use case, a company with independently managed subsidiaries may use the techniques disclosed herein to allow each subsidiary to independently manage its employee's devices, policies applicable to the devices, helpdesk features, and/or other aspects of the mobile devices. For example, device management partitions, content management partitions, support partitions, and/or other partitions may be generated for each of the subsidiaries. The partitions independent to each subsidiary may be used to manage mobile devices associated with that subsidiary, for example, independent of other subsidiaries.

In a further example use case, a company may outsource its mobile device support (e.g., helpdesk) to different providers for the portions of the company located in various geographic regions. For example, the company may outsource helpdesk for devices associated with its Asia location to support provider A. Similarly, the company may outsource helpdesk for devices associated with its North America location to support provider B. In this case, the policy and/or configuration creation/management may be centralized. In some embodiments, the following approach is used: domain objects may be created in a default device management partition, two rule-associated device management partitions are created—Asia and North America. Support provider A may be granted helpdesk roles in Asia and support provider B may be granted helpdesk roles in North America.

Figure 3:
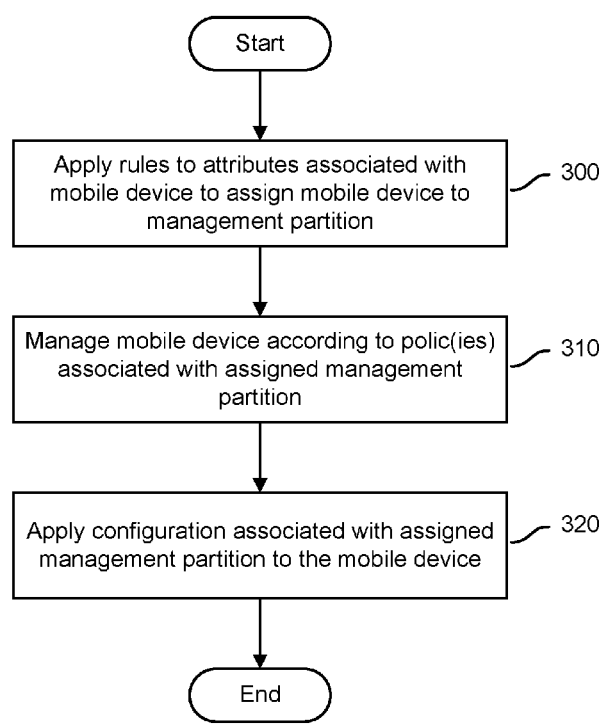
FIG. 3 is a flow chart illustrating embodiments of a process of rule-based mobile device management delegation.

FIG. 3 is a flow chart illustrating embodiments of a process of rule-based mobile device management delegation. In various embodiments, this process may be implemented on mobile device management platform 100 of FIG. 1. At 300, rules may be applied to attributes associated with a mobile device to assign the mobile device to a management partition. In various embodiments, one or more rules may be associated with a partition. Rules may include, for example, expressions to be evaluated to assign a mobile device to a partition. Rules may include, for example, criteria based on any information related to a mobile device and/or user. Rules may include, for example, expressions including combinations of one or more criteria, attributes, conditions associated with attributes (e.g., satisfied, partially satisfied, not satisfied, true, false, etc.), logical operators (e.g., Boolean logic operators), and/or other information.

In various embodiments, rules may be applied to attributes associated with a mobile device. Attributes associated with a mobile device may include, for example, mobile device service provider; mobile device operating system; mobile device type; user identity; user role; user groups; location, region and/or other geographic attribute associated with the user and/or device; and/or any other information associated with a mobile device, the mobile device's user, and/or associated entity.

In one example, a rule may be satisfied if device attributes indicate that the device is associated with a type of operating system (e.g., a type of OS (e.g., iOS, Android, etc.) that is installed on the device). In another example, a rule may be satisfied if attributes associated with a device indicate that the device is owned by an employee in a specific department (e.g., engineering) of an enterprise, the device is associated with a certain wireless carrier, and the device is in a predefined location. These rules include two possible examples; however, many different rules including any combination of information/criteria may be used. For example, rules may include any combination of information/criteria associated with a mobile device, user, and/or other entity.

In various embodiments, rules may be applied to attributes associated with a mobile device when a mobile device is initially registered with a mobile device management platform, upon occurrence of an event (e.g., an event causing a change to an attribute associated with the mobile device, a change of status associated with the mobile device and/or user, a monitored event, etc.), periodically (e.g., once a day, week, etc.), upon a change to a rule in a set of rules, and/or at any other time. For example, upon registration of an employee's mobile device with an enterprise (e.g., a tenant), rules may be applied to attributes associated with the mobile device and/or employee to assign the device to a partition (e.g., a device management partition, content management partition, etc.). In certain cases, rules may be applied to attributes associated with a mobile device and/or user periodically (e.g., after initialization) to determine whether the mobile device is assigned to a proper partition. For example, attributes associated with a mobile device and/or user may change during a device's lifecycle. Applying rules to attributes associated with a mobile device periodically, upon occurrence of event(s), and/or at any other time, may help to ensure that a mobile device is assigned to a proper partition.

According to various embodiments, a set of rules may be applied in an order, in parallel, and/or in any other manner. In one example, rules may be applied in an order such that a first rule associated with a first partition is applied, a second rule associated with a second partition is applied, and so on until attributes associated with a mobile device are determined to satisfy a rule. In certain cases, it may be determined that attributes associated with a mobile device do not satisfy any of a set of rules, and in this case the device may be assigned to a default partition, as discussed below.

In various embodiments, upon a determination that attributes associated with a mobile device satisfy a rule, the mobile device may be assigned to partition(s) and/or management domain(s) associated with the rule. In some cases, a mobile device may be assigned to a single partition, which is associated with a rule that attributes associated with the device have been determined to satisfy. By assigning a device to a single partition (e.g., a single device management partition) only one administrator and/or administration department may manage the device, thereby reducing (e.g., eliminating) potential conflicts that could arise from multiple administrators seeking to manage a single device. In other cases, attributes associated with a mobile device may be determined to satisfy multiple rules, and a mobile device associated therewith may be assigned to multiple partitions. In some cases, attributes associated with a device may satisfy multiple rules that are associated with different partitions, and the mobile device may be assigned to a best matching partition (e.g., a partition associated with a best matching rule, a most appropriate partition, etc.). In certain cases, attributes associated with a device may satisfy multiple rules that are associated with different partitions, and the mobile device may be assigned to a partition associated with a highest priority. A higher priority partition may be associated with a higher priority rule, and the higher priority rule may be applied to attributes associated with the mobile before lower priority rules are applied.

At 310, the mobile device may be managed according to polic(ies) associated with the assigned management partition. In various embodiments, a management partition may be associated with a device management domain, a content management domain, device support domain (e.g., helpdesk domain), and/or other domains. In some embodiments, a management partition may be associated with policies, and upon assignment to a partition, a device may be managed (e.g., automatically managed) according to the policies.

In some embodiments, policies associated with a device management partition may include WiFi access policies, password requirement policies, device data usage policies, content access policies, and/or any other type of policy associated with a mobile device and/or user. In various embodiments, policies associated with a device management partition may dictate an administrator's (e.g., an administrator delegated to the device management partition) access, permissions, and/or other management rights to the mobile device, objects associated with the mobile device (e.g., as included in a mobile device management, content management, and/or support partition), and/or other information associated with the mobile device. In some embodiments, policies associated with a content management partition may define a mobile device and/or user's access to and/or rights related to files, applications, and/or other content associated with the content management partition. In various embodiments, policies associated with a support partition may determine which support organization is provided access to a device, what information (e.g., device objects, content, etc.) the support organization may act upon, and/or other aspects of the support organization's interaction with a mobile device and/or user. In certain cases, a policy associated with a partition may dictate a mobile device's access to objects scoped within that partition. Policies may define (e.g., govern, legislate) any aspect of mobile device management, content management, and/or support within the assigned partition.

At 320, a configuration associated with the assigned management partition may be applied to the mobile device. In various embodiments, a posture of the mobile device may be automatically updated based on posture-related information (e.g., configurations, settings, etc.) associated with (e.g., defined by) the assigned management partition. By way of example, a new mobile device and/or user may be assigned to a partition, and upon assignment, a configuration associated with that partition may be applied (e.g., automatically applied) to the mobile device. In this case, a new device may be automatically configured upon assignment to a management partition (e.g., without requiring an administrator to configure the device). In another example, a mobile device and/or user may be reassigned (e.g., moved) from a first partition to a second partition (e.g., using the rule-based approaches discussed herein, by manual reassignment, etc.). Upon reassignment, configurations associated with the first partition may be removed, and the configuration(s) associated with the second partition may be applied to the device and/or user. In various embodiments, any aspect of a mobile device posture may be updated upon assignment and/or reassignment to a management partition.

In various embodiments, administration may be partitioned along any of one or more of multiple dimensions (e.g., device management, content management, support) and/or based on any attribute or association that may be defined within the system (e.g., region, business unit, etc.). And policies, configurations, and/or other information associated with an assigned partition may be applicable to the mobile device and/or user as well as administrators, support organizations, and/or other entities associated with the assigned partition.

Figure 4:
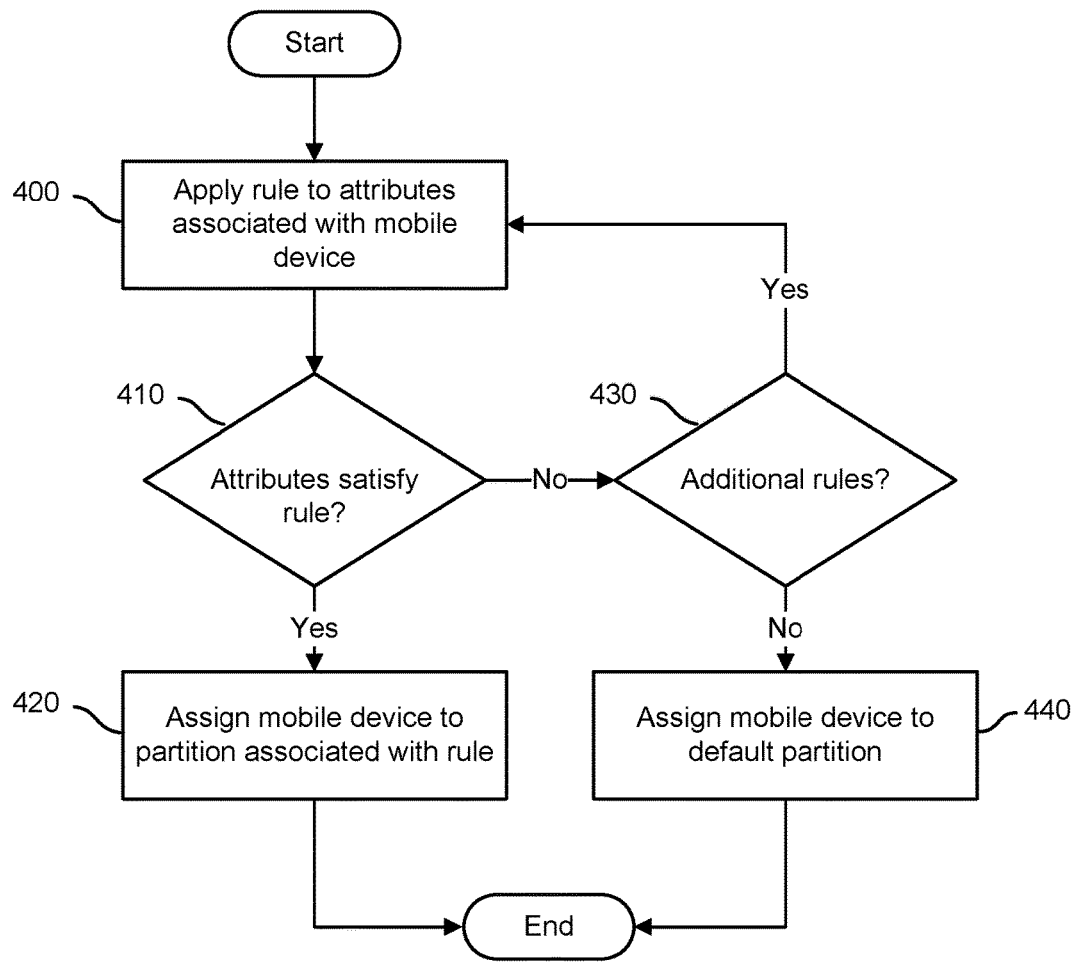
FIG. 4 is a flow chart illustrating embodiments of a process of rule-based mobile device management delegation.

FIG. 4 is a flow chart illustrating embodiments of a process of rule-based mobile device management delegation. In various embodiments, this process may be implemented on mobile device management platform 100 of FIG. 1. At 400, a rule is applied to attributes associated with a mobile device. As discussed above, rules may include, for example, expressions to be evaluated to assign a mobile device to a partition.

At 410, it may be determined whether attributes associated with a mobile device satisfy the rule. Attributes associated with a mobile device may satisfy a rule if conditions included in the rule are satisfied by (e.g., met by) the attributes associated with the mobile device and/or user. In one example, a rule may be satisfied if attributes indicate that the mobile device user (e.g., employee) is a member of a certain division within enterprise (e.g., sales), works at a certain location (e.g., the San Francisco office), is a management-level employee, and/or the user's mobile device is running the Android OS. In the event the attributes associated with a mobile device are determined to satisfy the rule, the process may proceed to step 420. In the event the attributes associated with the mobile device are determined to not satisfy the rule, the process may proceed to step 430.

At 420, the mobile device may be assigned to a partition associated with the rule. As discussed above, the mobile device may be managed according to polic(ies) associated with the assigned management partition. In some embodiments, configurations associated with the assigned management partition may be applied to the mobile device. In various embodiments, upon assignment to a partition, domain objects including policies, certificate authority information (e.g., local CA information, certificates, etc.), configurations, device groups, account to role mappings, content (e.g., files, applications, etc.), and/or other information applicable to a mobile device may be assigned to that management partition. The management domain objects may be accessible, editable, and/or otherwise actionable to users (e.g., administrators, helpdesk users, etc.) associated with the partition. For example, the management of a partition may be delegated to an enterprise administrator. When a device is assigned to the partition, the enterprise administrator associated with the partition may be provided access to management domain objects associated with the device, may be provided administrator rights associated with the device (e.g., management rights, remote access rights, etc.), and/or may otherwise manage the device.

At 430, it may be determined whether additional rules are to be applied. In various embodiments, a set of multiple rules associated with various partitions of a mobile device management system may be applied. For example, each rule in a set of rules may be associated with one of multiple partitions (e.g., a separate partition). In certain cases, a set of rules may be applied to mobile device attributes in an order. For example, rules in a set of rules may be applied according to a predefined order and/or hierarchy. In this case, rules in the set of rules may be applied according to the order until, for example, a rule is determined to be satisfied and/or no rules remain to be applied. In the event that additional rules in a set of rules remain to be applied, the process may proceed to step 400. In the event that no additional rules (e.g., in a set of rules) are to be applied, the process may proceed to step 440.

At 440, the mobile device may be assigned to a default partition. In various embodiments, a mobile device and/or user may be assigned to a default partition when attributes associated with the mobile device are determined not to satisfy rules (e.g., all rules) in a set of rules. A default partition may be associated with default device management domain, default content management domain, default support domain, and/or other domain. For example, upon assignment to a default device management partition, management domain objects including policies, certificate authority information (e.g., local CA information), configurations, device groups, account to role mappings, and/or other information applicable to a mobile device may be assigned to a default management partition. The management domain objects may be accessible, editable, and/or otherwise actionable to users (e.g., administrators, support personnel, IT organizations, etc.) associated with the default partition.

Figure 5:
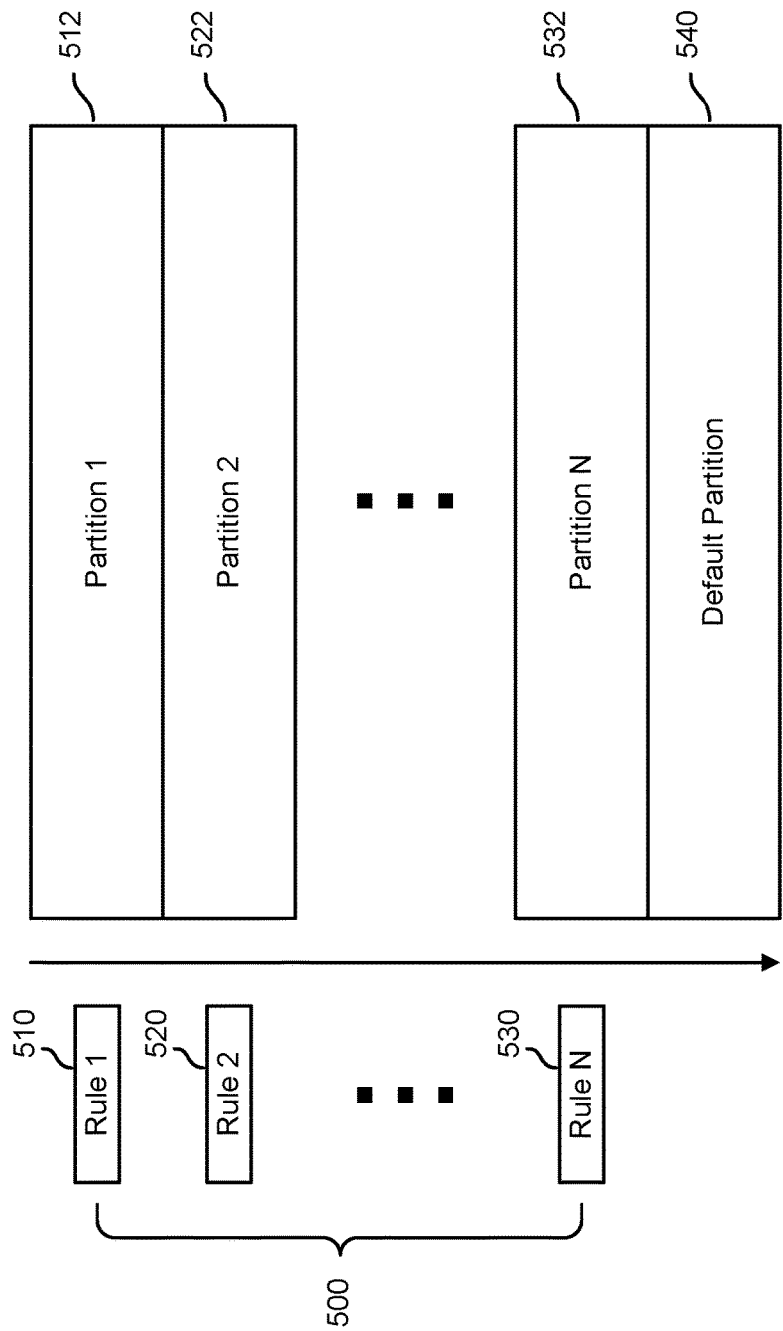
FIG. 5 is a block diagram illustrating embodiments of applying rules to attributes associated with a mobile device and/or user.

FIG. 5 is a block diagram illustrating embodiments of applying rules to attributes associated with a mobile device and/or user. In various embodiments, a set of rules 500 may be applied to attributes associated with a mobile device and/or a user associated with a mobile device. Rules 510, 520, 530 in the set of rules 500 may be associated with partitions 512, 522, 532 in a mobile device management framework. In one example, each rule in a set of rules may be associated with a separate partition. In the example shown, a first rule 510 may be associated with a first partition 512, a second rule 520 may be associated with a second partition 522, and so on up to an Nth rule 530 associated with an Nth partition 532. In another example (not shown), individual partitions may be associated with multiple rules (e.g., any number of rules).

In some embodiments, rules in a set of rules 500 may be applied to attributes associated with a mobile device and/or user in an order. In one example, the order may be dictated by a priority associated with each rule and/or associated partition. As a result, rules may be evaluated in order of importance/priority as defined, for example, by an administrator. In the example shown, a first rule 510 and/or the first partition 512 associated therewith may include a highest priority rule and/or partition. The first rule 510 may be applied to attributes associated with a mobile device and/or user. In the event the attributes satisfy the first rule 510, the mobile device and/or user may be assigned to the first partition 512. In the event the attributes do not satisfy the first rule 510, a second rule 520 may be applied. In the event the attributes satisfy the second rule 520, the mobile device and/or user may be assigned to the second partition 522. This process may continue through subsequent rule applications until and Nth rule 530 (e.g., a final rule) is applied. In the event the attributes satisfy the Nth rule 530, the mobile device and/or user may be assigned to the Nth partition 532. In the event the attributes do not satisfy the Nth rule 530 and/or any other rules, the mobile device and/or user may be assigned to a default partition 540.

In various embodiments, rules in a set of rules 500 may be applied to attributes associated with a mobile device and/or user and best matching rule(s) may be determined. In various embodiments, a mobile device and/or user may be assigned to a partition based on the highest score assigned to a device for a particular rule. For example, a rule may be applied to mobile device and/or user attributes and a score representing a level of match between the rule and the attributes may be generated. The score may, for example, indicate how well the attributes associated with the mobile device and/or user satisfy the conditions included in a rule (e.g., how many conditions are met by the attributes). A rule may, for example, be satisfied if a user is a member of certain group (e.g., engineering), the mobile device includes a certain operating system (e.g., Android), and the user is located in a certain geographic region (e.g., the United States). In the event user and/or mobile device attributes meet all the conditions, a high score (e.g., 1.0) indicating a high level match may be assigned. In the event the user and/or mobile device attributes meet some of the conditions (e.g., the user is a member of the engineering department, located in the U.S., but the user's phone includes an iOS operating system), a lower score (e.g., 0.5) may be assigned. In certain cases, multiple rules may be applied (e.g., a first rule 510, a second rule 520, up to an Nth rule 530) to mobile device and/or user attributes, and scores may be generated for the rules (e.g., each of the rules). A rule associated with a highest score may be determined, and the mobile device and/or user may be assigned to a partition associated with the determined rule (e.g., the rule associated with the highest score). For example, if it is determined that the second rule 520 is associated with a highest score (e.g., of multiple rules), the mobile device and/or user may be assigned to the second partition 522. In certain cases, it may be determined that scores associated with each of multiple applied rules are below a threshold score, and the mobile device and/or user may be applied to a default partition 540. Stated another way, if a mobile device and/or user attributes are not well matched to any of multiple applied rules, the mobile device may be assigned to a default partition 540.

In various embodiments, a mobile device and/or user may be assigned to a device management partition, content management partition, support partition, and/or other partitions using the rule-based approaches disclosed herein. In one example, a first set of rules may be applied to assign a mobile device and/or user to a device management partition, a second set of rules may be applied to assign a device to a content management partition, a third set of rules may be applied to assign a device to a support partition, and so on. In a further example, a mobile device and/or user may be manually assigned (e.g., by an administrator) to some partitions (e.g., a content management partition) and automatically assigned to other partitions (e.g., device management partitions) using the rule-based approaches disclosed herein. In another example, device management partitions, content management partitions, support partitions, and/or other types of partitions may be related. In this case, a single set of rules may be applied to assign a device to each of a related set of partitions.

Figure 6:
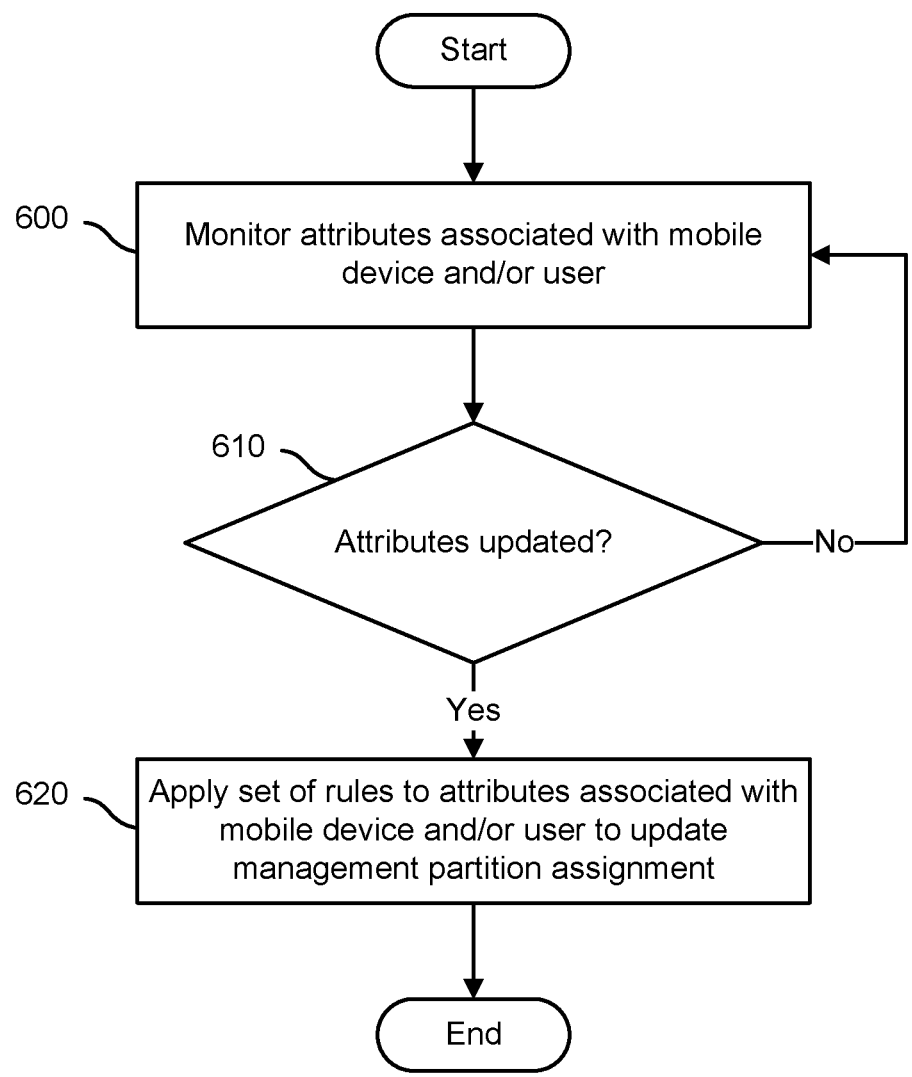
FIG. 6 is a flow chart illustrating embodiments of a process of updating a mobile device management partition assignment.

FIG. 6 is a flow chart illustrating embodiments of a process of updating a mobile device management partition assignment. In various embodiments, this process may be implemented on mobile device management platform 100 of FIG. 1. At 600, attributes associated with a mobile device and/or user may be monitored. In various embodiments, attributes may be monitored periodically (e.g., every five minutes, once a day, etc.), in real time, upon occurrence of triggering event, and/or in any other manner. Attributes may be monitored by, for example, a mobile device management platform (e.g., a mobile device management server), a mobile device client, an application, and/or other node. For example, mobile device and/or user attribute information may be stored on the mobile device, at a mobile device management platform, on an enterprise server, and/or other node, and these locations may be monitored to detect changes (if any) to the attribute information.

At 610, it may be determined whether attributes associated with the mobile device and/or user have been updated (e.g., changed). In various embodiments, attributes associated with a mobile device and/or user may be compared to previously monitored attributes to determine whether the attributes have changed. By way of example, attributes associated with a mobile device may change when a mobile device operating system is updated (e.g., from iOS 7 to iOS 8); when a device is changed from a first wireless carrier to a second wireless carrier; when applications are installed (e.g., restricted applications); when a mobile device is transferred from a first user to a second user; when a user changes roles (e.g., receives promotion), groups, locations, etc.; when a corporate structure is modified, and/or upon occurrence of other events.

At 620, a set of rules may be applied to attributes associated with a mobile device and/or user to update the device management partition to which the mobile device is assigned. In various embodiments, rules in a set of rules may be applied to the attributes using the approaches disclosed herein, and upon a determination that the attributes satisfy a rule, the mobile device and/or user may be assigned and/or reassigned to a partition associated with the rule. In the event that the attributes do not satisfy any rule in the rule set, the mobile device may be assigned to a default partition and/or may remain assigned to a previously assigned partition.

In various embodiments, a mobile device and/or user may be reassigned (e.g., moved) from a first partition to a second partition. Upon reassignment from the first partition to the second partition, device posture, policies, configurations, device data, and/or other aspects associated with the device and/or user may be updated (e.g., may change). For example, prior to reassignment, a mobile device may be configured according to a first configuration associated with the first partition. Upon reassignment from the first partition, the first configuration may be automatically removed (e.g., in the case that the first configuration is not applicable to the second partition and/or only applicable to the first partition). Once assigned to the second partition, the mobile device may receive and/or be configured to a second configuration associated with the second partition. In various embodiments, upon reassignment from a first partition to a second partition data may be removed from the device (e.g., data associated with the first partition) and/or other data (e.g., data associated with the second partitions) may be added to the device. The data removed and/or added may include, for example, applications, contact information, enterprise-related information, and/or any other type of data. Similar updating, removal and/or replacement of mobile device posture-related information, policies, and/or other device attributes may occur upon transfer from a first partition to a second partition.

Figure 7:
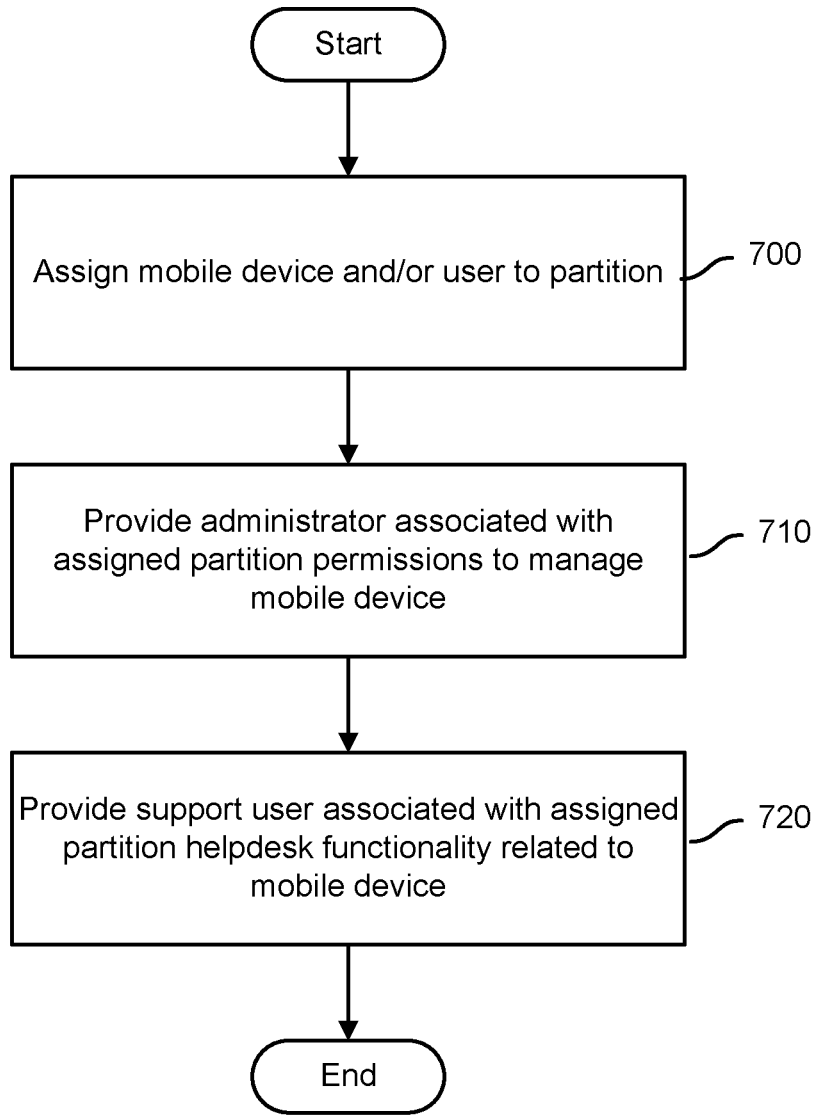
FIG. 7 is a flow chart illustrating embodiments of a process of mobile device management and/or support.

FIG. 7 is a flow chart illustrating embodiments of a process of mobile device management and/or support. At 700, a mobile device and/or user may be assigned to a partition. In various embodiments, the mobile device and/or user may be assigned to a rule-associated partition, default partition, and/or other partition using the techniques disclosed herein.

At 710, administrator(s) associated with (e.g., delegated to) the assigned partition may be provided permissions to manage the mobile device. An administrator (e.g., an enterprise administrator, contracted administrator, etc.) may be delegated permission, access, and/or other rights necessary to manage devices (e.g., all devices) associated with a partition. For example, an administrator delegated to manage devices associated with a device management partition may be provided permissions to access objects associated with the mobile device (e.g., stored at device management platform), access information stored on the mobile device, create/edit policies applicable to the mobile device, modify mobile device configurations (e.g., WiFi access, passcode restrictions, etc.), manage certificate information (e.g., local CA information), and/or perform any other management-related operations related to the mobile device and/or user.

At 720, a support user associated with (e.g., delegated to) the assigned partition may be provided helpdesk functionality related to the mobile device. In various embodiments, a support provider (e.g., helpdesk administrator, third-party support provider, etc.) may be provided access, device control permissions, and/or other helpdesk functionality that may be useful in providing support for and/or troubleshooting the mobile device.

In various embodiments, a helpdesk function may be contracted out to a first provider for devices and/or users associated with a first region and to a second provider for devices and/or users associated with a second region. In one example, a first set of devices may be associated with users based in the United States and a second set of devices may be associated with users in Asia. The first set of devices may be assigned (e.g., using the techniques disclosed herein) to a first partition. The first partition may be associated with the United States (e.g., may be contracted out to a U.S. provider, may be accessible to U.S. administrators, etc.). The second set of devices may be assigned to a second partition, and the second partition may be associated with Asia. Data useful (e.g., necessary) to provide support to the first users/devices would be made available only to the first provider, whereas data useful to provide support to the second users/devices would be made available only to the second provider. In some embodiments, this may be provided by defining for each set of users a logical partition within a broader management system and delegating the first partition to the first provider and the second partition to the second provider.

Figure 8:
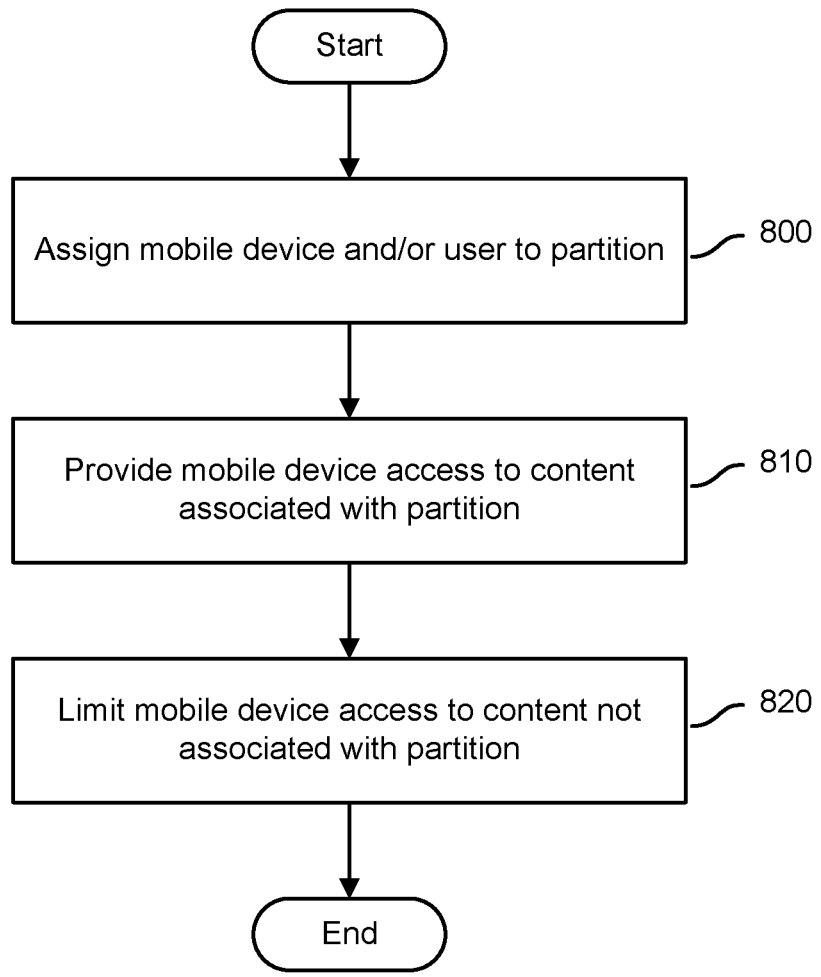
FIG. 8 is a flow chart illustrating embodiments of a process of content management.

FIG. 8 is a flow chart illustrating embodiments of a process of content management. At 800, a mobile device and/or user may be assigned to a partition (e.g., content management partition). In various embodiments, the mobile device and/or user may be assigned to a rule-associated partition, default partition, and/or other content management partition using the techniques disclosed herein.

At 810, the mobile device may be provided access to content associated with one or more content management partitions. In various embodiments, a content management partition and/or policies associated therewith may, for example, dictate (e.g., govern) access, permissions, and/or other aspects of interaction with: content on a mobile device (e.g., by a device user), content generated/edited on a mobile device, and/or content otherwise associated with a mobile device. For example, an administrator may define content management partition policies that dictate which content may be accessed at a mobile device assigned to that partition. Content may include, for example, applications, files (e.g., documents, pdfs, images, etc.), and/or any other type of content. A mobile device and/or user's access, permissions (e.g., read, write, edit, etc.), and/or other rights related to content may be defined by policies associated with partitions to which the mobile device and/or user are assigned. In one example, a mobile device may be permitted to download (e.g., only download) applications associated with the one or more partitions (e.g., included in a container associated with the partition) to which the mobile device is assigned. In another example, a mobile device and/or user may be provided access and/or edit permissions to a set of documents associated with the one or more partitions to which the mobile device is assigned.

At 820, a mobile device's and/or user's access to content not associated with the partition may be limited. In various embodiments, multiple partitions may be defined within a site and/or tenant (e.g., enterprise and/or portion thereof). Upon assignment to a content management partition, a mobile device may be provided access to content within that partition and the mobile device's access to content in other partitions may be limited (e.g., restricted, read-only access, etc.). In one example, a mobile device may be assigned to a partition associated with an engineering department in an organization, and the mobile device may be provided read, write, and/or edit rights to content within the engineering partition. This device assigned to an engineering department content management partition, however, may be provided limited rights (e.g., no access, read only, etc.) to content not associated with the engineering partition (e.g., content in a sales department partition).

Figure 9:
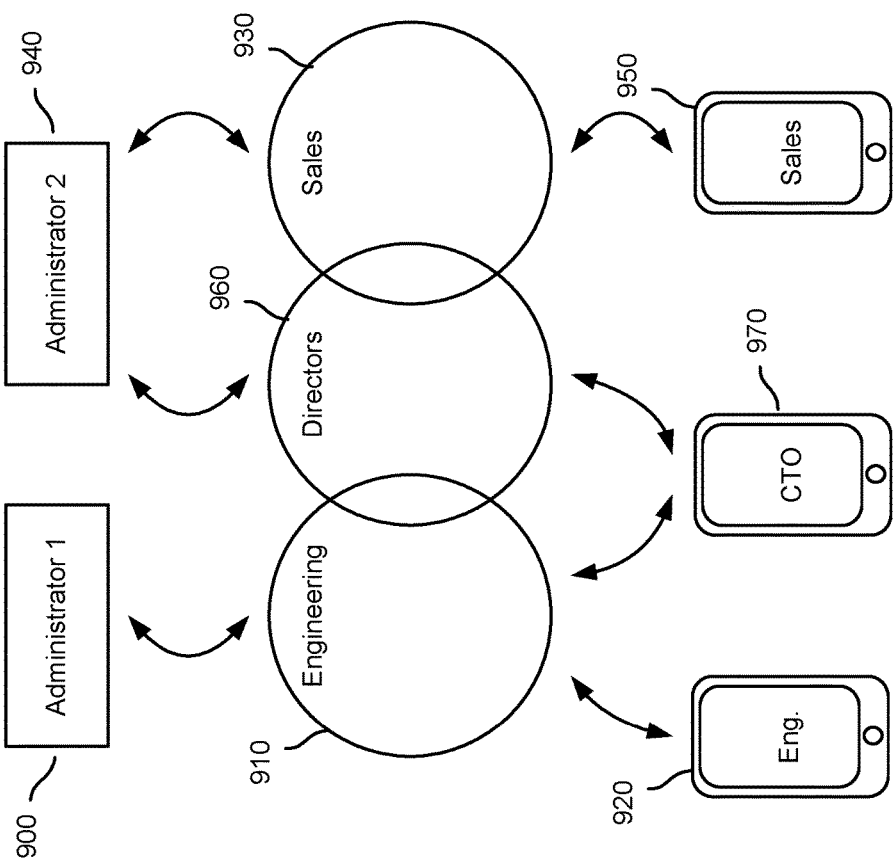
FIG. 9 is a block diagram illustrating embodiments of content management in a delegated mobile device management framework.

FIG. 9 is a block diagram illustrating embodiments of content management in a delegated mobile device management framework. In some embodiments, mobile device access to enterprise content (e.g., stored on a server) is managed on a partition-by-partition basis. In the example shown, a first administrator 900 (e.g., an engineering department IT administrator) may be delegated the ability to define access control policies for content stored in an engineering-specific logical container 910 within a broader set of managed content. For example, for content in the engineering container 910, some management-level employees (e.g., a chief operating officer (COO) (not shown)) may be able to create and/or add to documents, but only engineering professionals 920 (e.g., devices associated with engineering professionals, chief technology officer (CTO) 970, etc.) may be permitted to access, read, and/or write to content they did not personally create. Similarly, access to content in a sales department container 930 may be governed by policies defined by a second administrator 940 (e.g., a sales department IT administrator) to whom the power to define such policies with respect to content in the sales container has been delegated. In this case, sales department employees 950 may be permitted to access, read, and/or write to content they did not personally create, while some management-level employees (e.g., a vice president of finance (not shown)) may be able to create and/or add to files.

In another example, the second administrator 940 (e.g., a director and sales department IT administrator) may be delegated the ability to define access control policies for content stored in a director-specific logical container 960 within a broader set of managed content. In this case, director-level employees (e.g., the chief technology officer (CTO) 970, COO, etc.) may be provided access, read, and/or write permissions to content within the director-specific logical container 960, while no other employees (e.g., non-director employees) are permitted any access to content in the director-specific container 960.

In some cases, certain employees may be permitted to access, read, and/or write to content in multiple containers. For example, the CTO 970 may be provided access to content in both the engineering-specific logical container 910 and/or the director specific logical container 960.

In some embodiments, the ability to control the inventory of applications available to be installed on a managed device (e.g., via an enterprise and/or other managed app store) may be delegated to different administrators for different devices and/or users (e.g., by region, business unit, role, etc.). As each user accesses the app store, for example, the set of apps defined by the domain administrator for the domain that the user and/or device is associated with is made available. For example, a user in the engineering department 920 who has a position below a "director" level may have access to a set of apps 910 (e.g., engineering department apps) defined by the first administrator 900 (e.g., engineering department administrator) as being available to a below management-level employee within that organization. A "director" level employee in the engineering organization (e.g., the CTO 970) may see a different set of apps (e.g., combination of app set 910 and/or app set 960), as determined by policies defined by an engineering organization administrator 900 and/or director administrator 940. Similarly, a user in the sales department 950 may be provided access different set of apps 930 determined by a sales department administrator 940.

The examples above are discussed with reference to content management across various departments and/or roles within an enterprise; however, similar content management approaches may be used across different geographic locations (e.g., within an enterprise), across multiple separate enterprises, across different device types, across different wireless carriers, and/or any other groups of devices and/or users.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
applying, by a processor, a set of rules to attributes associated with a mobile device to assign the mobile device to one of a plurality of management partitions;
managing the mobile device according to a policy associated with the assigned management partition, wherein the policy at least in part describes an access of the mobile device to objects scoped within the assigned management partition, wherein the access of the mobile device to content associated with unassigned partitions is limited;
determining a change to the set of rules;
applying the changed set of rules to the attributes to reassign the mobile device to a second management partition included in the plurality of management partitions;
removing a configuration associated with the assigned management partition from the mobile device; and
applying a configuration associated with the second management partition to the mobile device.

2. The method of claim 1, further comprising:
applying the configuration associated with the assigned management partition to the mobile device.

3. The method of claim 1, wherein applying the set of rules further comprises:
determining that the attributes associated with the mobile device satisfy a rule in the set of rules; and
assigning, based at least in part on the determination, the mobile device to a partition associated with the rule.

4. The method of claim 3, wherein determining that the attributes associated with the mobile device satisfy the rule further comprises:
applying the set of rules to the attributes associated with the mobile device to determine a score associated with each rule in the set of the rules;
determining a rule in the set of rules that is associated with a highest score; and
assigning the mobile device to a partition associated with the rule.

5. The method of claim 1, further comprising determining that the attributes associated with the mobile device have been updated.

6. The method of claim 1, wherein applying the set of rules further comprises:
applying a plurality of rules in the set of rules to attributes associated with the mobile device;
determining that the attributes do not satisfy any of the plurality of rules; and
assigning the mobile device to a default management partition based at least in part on the determination.

7. The method of claim 1, further comprising:
determining a change to the attributes associated with the mobile device; and
applying the set of rules to the changed attributes to reassign the mobile device to another partition included in the plurality of management partitions.

8. The method of claim 1, further comprising
reassigning the mobile device from the assigned management partition to the second management partition.

9. The method of claim 1, wherein rules in the set of rules each correspond to one of the plurality of management partitions.

10. The method of claim 1, wherein the set of rules comprises a plurality of rules arranged in an order.

11. The method of claim 1, wherein the management partitions include a default partition and a rule-associated partition.

12. The method of claim 1, wherein the plurality of management partitions are associated with management domains.

13. The method of claim 1, further comprising:
assigning objects associated with the mobile device to one or more of a device management domain and a content management domain associated with the assigned management partition.

14. The method of claim 1, further comprising:
providing an administrator associated with the assigned management partition permissions to manage or access the mobile device.

15. The method of claim 1, further comprising:
providing a support organization associated with the assigned partition helpdesk functionality in relation to the mobile device.

16. The method of claim 1, further comprising:
providing, to the user of the mobile device, access to content associated with the assigned management partition.

17. The method of claim 1, further comprising:
restricting access in the context of the mobile device to content not associated with the assigned management partition.

18. A system, comprising:
a processor; and
a memory coupled with the processor, wherein the memory is configured to provide the processor with instructions which when executed cause the processor to:
apply a set of rules to attributes associated with a mobile device to assign the mobile device to one of a plurality of management partitions;
manage the mobile device according to a policy associated with the assigned management partition, wherein the policy at least in part describes an access of the mobile device to objects scoped within the assigned management partition, wherein the access of the mobile device to content associated with unassigned partitions is limited;
determine a change to the set of rules;
apply the changed set of rules to the attributes to reassign the mobile device to a second management partition included in the plurality of management partitions;
remove a configuration associated with the assigned management partition from the mobile device; and
apply a configuration associated with the second management partition to the mobile device.

19. The system recited in claim 18, wherein the memory is further configured to provide the processor with instructions which when executed cause the processor to:
apply the configuration associated with the assigned management partition to the mobile device.

20. A computer program product, the computer program product being embodied in a tangible non-transitory computer readable storage medium and comprising computer instructions for:
applying a set of rules to attributes associated with a mobile device to assign the mobile device to one of a plurality of management partitions;
managing the mobile device according to a policy associated with the assigned management partition, wherein the policy at least in part describes an access of the mobile device to objects scoped within the assigned management partition, wherein the access of the mobile device to content associated with unassigned partitions is limited;
determining a change to the set of rules;
applying the changed set of rules to the attributes to reassign the mobile device to a second management partition included in the plurality of management partitions;
removing a configuration associated with the assigned management partition from the mobile device; and
applying a configuration associated with the second management partition to the mobile device.

* * * * *